US008537786B2

United States Patent
Tseng

(10) Patent No.: US 8,537,786 B2
(45) Date of Patent: Sep. 17, 2013

(54) METHOD AND APPARATUS FOR IMPROVING CONTINUOUS PACKET CONNECTIVITY IN A WIRELESS COMMUNICATIONS SYSTEM

(75) Inventor: Li-Chih Tseng, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 1254 days.

(21) Appl. No.: 12/184,255

(22) Filed: Aug. 1, 2008

(65) Prior Publication Data
US 2009/0034485 A1    Feb. 5, 2009

Related U.S. Application Data

(60) Provisional application No. 60/953,472, filed on Aug. 2, 2007.

(51) Int. Cl.
*G08C 17/00* (2006.01)
*H04W 4/00* (2009.01)

(52) U.S. Cl.
USPC ........... 370/335; 370/311; 370/328; 370/331; 370/338

(58) Field of Classification Search
USPC ....................................................... 370/335
See application file for complete search history.

(56) References Cited

U.S. PATENT DOCUMENTS

| | | | | |
|---|---|---|---|---|
| 6,934,321 B2 * | 8/2005 | Sato | | 370/335 |
| 7,072,306 B2 * | 7/2006 | Blessent | | 370/335 |
| 7,385,949 B1 * | 6/2008 | Botha | | 370/329 |
| 7,539,157 B2 * | 5/2009 | Ohsuge | | 370/328 |
| 2003/0086379 A1 | 5/2003 | Terry | | |
| 2006/0252452 A1 * | 11/2006 | Umesh et al. | | 370/312 |
| 2006/0274712 A1 * | 12/2006 | Malladi et al. | | 370/345 |
| 2007/0030828 A1 * | 2/2007 | Vimpari et al. | | 370/335 |
| 2007/0133479 A1 * | 6/2007 | Montojo et al. | | 370/328 |
| 2007/0291729 A1 * | 12/2007 | Dalsgaard et al. | | 370/347 |
| 2008/0130488 A1 * | 6/2008 | Kuo | | 370/216 |

(Continued)

FOREIGN PATENT DOCUMENTS

| | | |
|---|---|---|
| JP | 2008141758 A | 6/2008 |
| KR | 1020080049671 A | 6/2008 |
| KR | 1020080057200 A | 6/2008 |

OTHER PUBLICATIONS

Qualcomm Europe: "Correction to relation between DTX-DRX timing and DTX-DRX configuration", 3GPP TSG-RAN WG2 #62, R2-082398, May 5-9, 2008, XP002563529, Kansas City, Missouri, USA.

(Continued)

*Primary Examiner* — Ian N Moore
*Assistant Examiner* — Jenee Alexander
(74) *Attorney, Agent, or Firm* — Blue Capital Law Firm, P.C.

(57) ABSTRACT

A method of improving CPC for a UE in a wireless communications system includes receiving a reconfiguration message, determining the content of a second information element, abbreviated to IE, included in a first IE when the first IE is included in the reconfiguration message, wherein the first IE is used for indicating timing information of a discontinuous transmission and discontinuous reception, abbreviated to DTX-DRX, operation and the second IE is used for selecting a timing of the DTX-DRX operation, and using the content of the first IE without storing the content of the first IE when the content of the second IE is a new timing.

20 Claims, 6 Drawing Sheets

(56) References Cited

U.S. PATENT DOCUMENTS

| | | | |
|---|---|---|---|
| 2008/0175204 A1* | 7/2008 | Jen | 370/331 |
| 2008/0232310 A1* | 9/2008 | Xu | 370/329 |
| 2008/0287149 A1* | 11/2008 | Womack et al. | 455/466 |
| 2009/0122736 A1* | 5/2009 | Damnjanovic et al. | 370/311 |
| 2010/0113054 A1* | 5/2010 | Iwamura et al. | 455/452.1 |

OTHER PUBLICATIONS

3GPP, 3GPP TS 25.331 V7.4.0 (Mar. 2007), "Radio Resource Control (RRC) (Release 7)", p. 281-282, p. 347, p. 626-627, p. 1109, 200703.

"Universal Mobile Telecommunications System (UMTS); Radio Resource Control (RRC); Protocol specification (3GPP TS 25.331 version 7.5.0 Release 7)", ETSI TS 125 331 V7.5.0 (Jun. 2007), section 8.5.34 & 8.6.6.38, XP014040019, ETSI Standards, LIS, Sophia Antipolis Cedex, France.

Office Action on related JP Patent Application No. 2008-200646 issued on Feb. 1, 2011.

Office Action on related JP Patent Application No. 2009-171087 issued on Feb. 1, 2011.

Notice of Allowance on corresponding foreign application (KR Application No. 10-2009-0064147) from the Korean Intellectual Property Office dated Oct. 28, 2010.

* cited by examiner

METHOD AND APPARATUS FOR IMPROVING CONTINUOUS PACKET CONNECTIVITY IN A WIRELESS COMMUNICATIONS SYSTEM

CROSS REFERENCE TO RELATED APPLICATIONS

This application claims the benefit of U.S. Provisional Application No. 60/953,472, filed on Aug. 2, 2007 and entitled "Method and Apparatus for Improving the DTX-DRX Operation in CPC (Continuous Packet Connectivity)", the contents of which are incorporated herein by reference.

BACKGROUND OF THE INVENTION

1. Field of the Invention

The present invention relates to a method and related apparatus for improving Continuous Packet Connectivity in a wireless communications system, and more particularly, to a method and related apparatus for improving a start procedure of DTX-DRX operation, for improving Continuous Packet Connectivity.

2. Description of the Prior Art

The third generation (3G) mobile telecommunications system, the Universal Mobile Telecommunications System (UMTS), has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS (Quality of Service) requirements simultaneously, providing diverse, flexible, two-way transmission services and better communication quality to reduce transmission interruption rates. Through the 3G mobile telecommunications system, a user can utilize a wireless communications device, such as a mobile phone, to realize real-time video communications, conference calls, real-time games, online music broadcasts, and email sending/receiving. However, these functions rely on fast, instantaneous transmission. Thus, targeting the third generation mobile telecommunication technology, the prior art provides High Speed Package Access (HSPA) technology, which includes High Speed Downlink Package Access (HSDPA) and High Speed Uplink Package Access (HSUPA), to increase bandwidth utility rate and package data processing efficiency to improve uplink/downlink transmission rate.

According to the related protocol specifications, one of protocol stacks of the UMTS, access stratum (AS), can be segmented into sub-layers for different functions. The operations of the sub-layers in the AS are well known in the art, and detailed description is not given here. The Radio Resource Control (RRC) layer, a Layer 3 protocol, is the core of communications protocols related to AS and is located in radio network controllers (RNC) of the UMTS Terrestrial Radio Access Network (UTRAN) and a user equipment (UE). The RRC layer uses RRC messages to perform RRC procedures. RRC messages are formed from many information elements (IEs) used for embedding necessary information for setting, changing, or releasing protocol entities of Layer 2 and Layer 1, thereby establishing, adjusting, or canceling information exchange channels to perform data packet transportation.

For improving HSDPA and HSUPA, the 3rd Generation Partnership Project (3GPP) provides a Continuous Packet Connectivity (CPC) protocol specification, which includes features that, for UEs in CELL_DCH state, aim to significantly increase the number of packet data users for a cell, reduce the uplink noise rise and improve the achievable download capacity for VoIP.

According to the CPC protocol specification, a discontinuous transmission and discontinuous reception (DTX-DRX) operation is used to reduce power consumption when transmission between a UE and the UTRAN is decreasing. The DTX-DRX operation includes discontinuous uplink transmission (uplink DTX), discontinuous uplink reception (uplink DRX) and discontinuous downlink reception (downlink DRX). Uplink DTX is a mechanism where control signals are transmitted on the uplink control channels according to defined discontinuous patterns during the inactive state of corresponding uplink data channels, such as Enhanced Dedicated Transport Channel (E-DCH) or High Speed Physical Control Channel (HS-DPCCH), in order to maintain signal synchronization and power control loop with less control signaling. Uplink DRX is utilized for controlling the UE to transmit E-DCH in specific time interval and has to be configured with uplink DTX. Downlink DRX is configured by a Radio Network Controller (RNC) and allows the UE to restrict the downlink reception times in order to reduce power consumption. When the downlink DRX is enabled, the UE is not required to receive physical downlink channels except for several specific situations. Please note that the DTX-DRX operation is enabled only when the UE is in CELL_DCH state.

Associated configurations of the DTX-DRX operation are described as follows. If the UE receives RRC CONNECTION SETUP, ACTIVE SET UPDATE, CELL UPDATE CONFIRM, or any other reconfiguration message, the UE shall determine the value for a DTX_DRX_STATUS variable that indicates a status of the DTX-DRX operation. The DTX_DRX_STATUS variable shall be set to TRUE for starting the DTX-DRX operation only when all the following conditions are met:

1. the UE is in CELL_DCH state;
2. both variables HS_DSCH RECEPTION and E_DCH_TRANSMISSION are set to TRUE;
3. no DCH transport channel is configured;
4. a variable DTX_DRX_PARAMS is set; and
5. the UE received an IE "DTX-DRX timing information".

If any one of the above conditions is not met and the variable DTX_DRX_STATUS is set to TRUE, the UE shall:
1. set the variable DTX_DRX_STATUS to FALSE;
2. clear the variable DTX_DRX_PARAMS; and
3. stop the DTX-DRX operation related activities.

In summary, the UE controls start or stop of the DTX-DRX operation by setting the variable DTX_DRX_STATUS to TRUE or FALSE. On the other hand, the UE stores the content of the received IE "DTX-DRX timing information" in the variable DTX_DRX_PARAMS. The variable DTX_DRX_PARAMS includes the IE "DTX-DRX timing information" and an IE "DTX-DRX information". The IE "DTX-DRX timing information" is used for indicating timing information of the DTX-DRX operation and comprises other IEs, such as an IE "CHOICE timing", an IE "DTX information", an IE "DRX information", and so on. The UTRAN has to transmit the IE "CHOICE timing" using for selecting a timing of the DTX-DRX operation to the UE to reconfigure the timing of the DTX-DRX operation. The content of the IE "CHOICE timing" comprises "new timing" or "continue".

Known as associated 3GPP protocols, if the UE confirms that the IE "DTX-DRX timing information" is included in a received reconfiguration message and the IE "CHOICE timing" is set to "new timing", the UE stores the content of the IE "DTX-DRX timing information" in the variable DTX_DRX- PARAMS. At the same time, if the UE confirms that the IE "DTX-DRX information" is included in the received reconfiguration message, the UE also stores the content of the IE "DTX-DRX information" in the variable DTX_DRX_PARAMS.

In fact, if the UE confirms that the IE "CHOICE timing" is set to "new timing", the UE can use the content of the IE "DTX-DRX timing information" and does not store it in the variable DTX_DRX_PARAMS. The UE only stores the IE "DTX-DRX information" in the variable DTX_DRX_PARAMS.

From the above, the UE starts the DTX-DRX operation only when all the above 5 conditions are met. In other words, the UE stops the DTX-DRX operation only when any one of the above 5 conditions is repealed. For example, the UE has to leave CELL_DCH state, or sets the variables HS_DSCH RECEPTION and E_DCH_TRANSMISSION to FALSE in order to stop the DTX-DRX operation after the DTX-DRX operation is enabled. In other words, the UE has to disable HSDPA and HSUPA for stopping the DTX-DRX operation. If the UE wants to keep transmission, the UE has to enter CELL_DCH state again. In addition, the variable DTX_DRX_PARAMS is set and the IE "DTX-DRX timing information" is received after the DTX-DRX operation is enabled. Therefore, it is impossible to stop the DTX-DRX operation by repealing the last two of the above 5 conditions.

In conclusion, it is difficult to stop the DTX-DRX operation by repealing any one of the above 5 conditions when the DTX-DRX operation is enabled. Therefore, transmission efficiency of CPC is decreased.

SUMMARY OF THE INVENTION

The present invention provides a method and related apparatus for improving CPC for a UE in a wireless communications system.

The present invention discloses a method of improving CPC for a UE in a wireless communications system. The method includes receiving a reconfiguration message, determining the content of a second IE included in a first IE when the first IE is included in the reconfiguration message, wherein the first IE is used for indicating timing information of a DTX-DRX operation and the second IE is used for selecting a timing of the DTX-DRX operation, and using the content of the first IE without storing the content of the first IE when the content of the second IE is a new timing.

The present invention further discloses a communications device used in a wireless communications system for improving CPC. The communications device includes a control circuit for realizing functions of the communications device, a central processing unit installed in the control circuit for executing a program code to operate the control circuit, and a memory coupled to the central processing unit for storing the program code. The program code includes receiving a reconfiguration message, determining the content of a second IE included in a first IE when the first IE is included in the reconfiguration message, wherein the first IE is used for indicating timing information of a DTX-DRX operation and the second IE is used for selecting a timing of the DTX-DRX operation, and using the content of the first IE without storing the content of the first IE when the content of the second IE is a new timing.

The present invention further discloses a method of improving CPC for a UE in a wireless communications system. The method includes receiving a reconfiguration message, and starting a DTX-DRX operation when the UE meets a plurality of conditions and confirms that a specific IE is included in the reconfiguration message, wherein the specific IE is used for storing timing information of the DTX-DRX operation.

The present invention further discloses a communications device used in a wireless communications system for improving CPC. The communications device includes a control circuit for realizing functions of the communications device, a central processing unit installed in the control circuit for executing a program code to operate the control circuit, and a memory coupled to the central processing unit for storing the program code. The program code includes receiving a reconfiguration message, and starting a DTX-DRX operation when the communications device meets a plurality of conditions and confirms that a specific IE is included in the reconfiguration message, wherein the specific IE is used for storing timing information of the DTX-DRX operation.

The present invention further discloses a method of improving CPC for a network terminal in a wireless communications system. The method includes generating a reconfiguration message, adding a second IE to the reconfiguration message when the network terminal confirms that a first IE is included in the reconfiguration message, wherein the first IE is used for indicating information of a DTX-DRX operation and the second IE is used for indicating timing information of the DTX-DRX operation, and transmitting the reconfiguration message to a user equipment in the wireless communications system.

The present invention further discloses a communications device used in a wireless communications system for improving CPC. The communications device includes a control circuit for realizing functions of the communications device, a central processing unit installed in the control circuit for executing a program code to operate the control circuit, and a memory coupled to the central processing unit for storing the program code. The program code includes generating a reconfiguration message, adding a second IE to the reconfiguration message when the communications device confirms that a first IE is included in the reconfiguration message, wherein the first IE is used for indicating information of a DTX-DRX operation and the second IE is used for indicating timing information of the DTX-DRX operation, and transmitting the reconfiguration message to a user equipment in the wireless communications system.

These and other objectives of the present invention will no doubt become obvious to those of ordinary skill in the art after reading the following detailed description of the preferred embodiment that is illustrated in the various figures and drawings.

DETAILED DESCRIPTION

Figure 6:
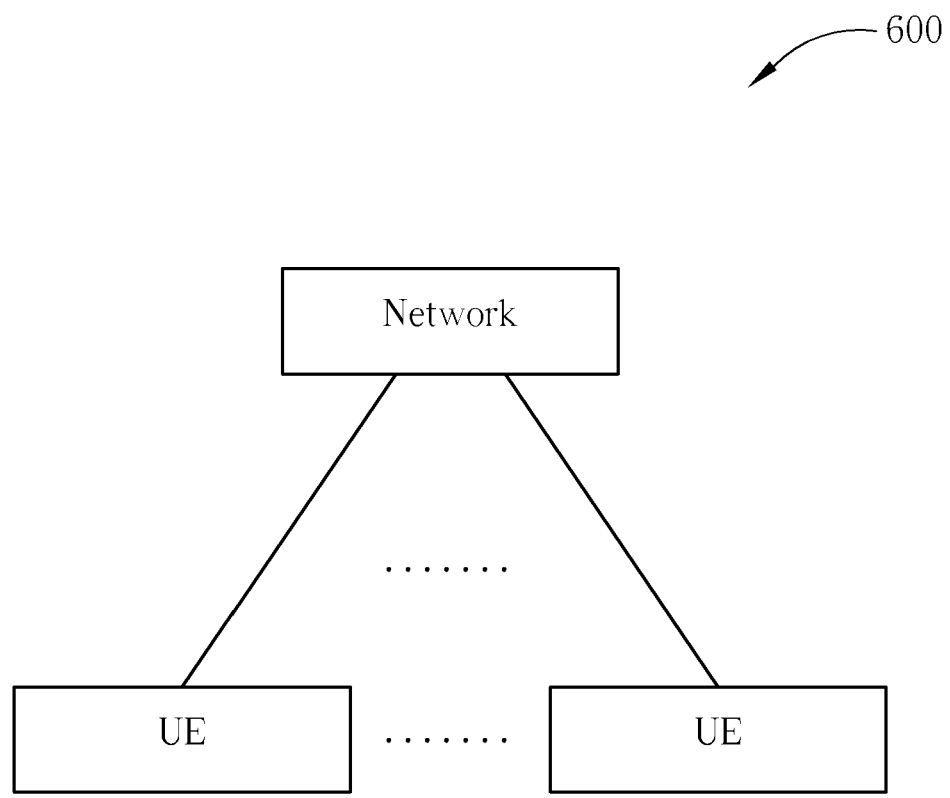
FIG. 6 is a schematic diagram of a communications system.

Please refer to FIG. 6, which is a schematic diagram of a wireless communications system 600. The wireless communications system 600 is preferably a High Speed Package Access (HSPA) system, and is briefly composed of a network and a plurality of user equipments (UEs). In FIG. 6, the network and the UEs are simply utilized for illustrating the structure of the wireless communications system 600. Practically, the network may comprise a plurality of base stations (or Node B), radio network controllers and so on according to actual demands, and the UEs can be devices such as mobile phones, computer systems, etc.

Figure 1:
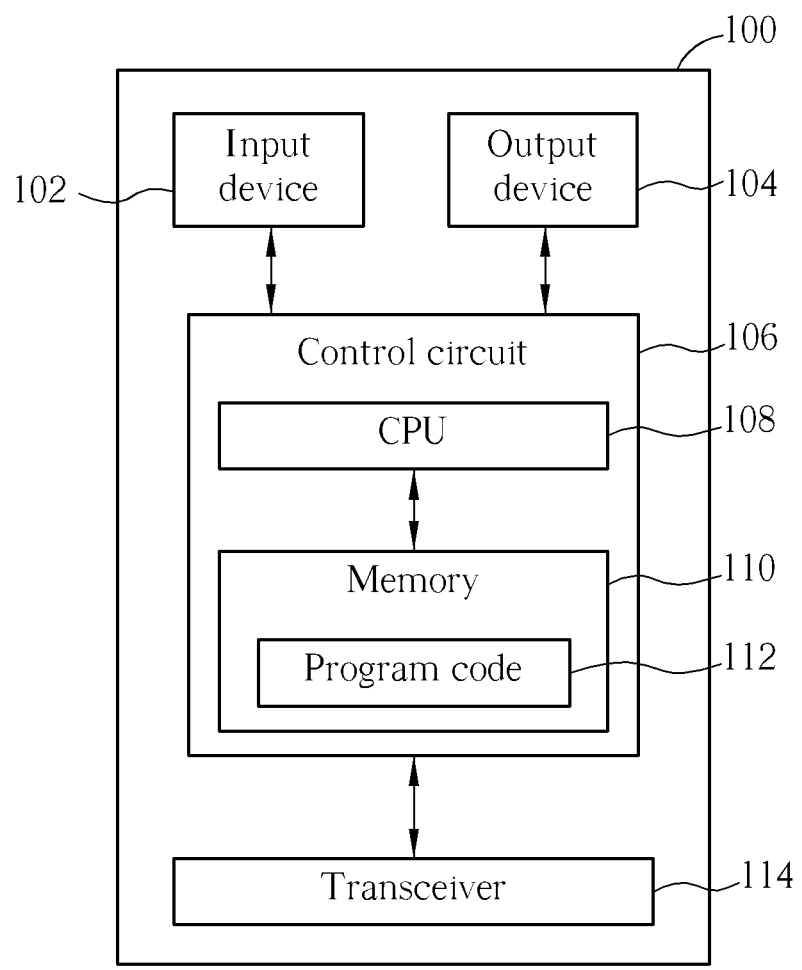
FIG. 1 is a functional block diagram of a communications device.

Please refer to FIG. 1, which is a functional block diagram of a communications device 100. The communications device 100 can be used for implementing the network or the UE shown in FIG. 4. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, deliver received signals to the control circuit 106, and output signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. Preferably, the communications device 100 is utilized in the HSPA system, supporting Continuous Packet Connectivity (CPC).

Figure 2:
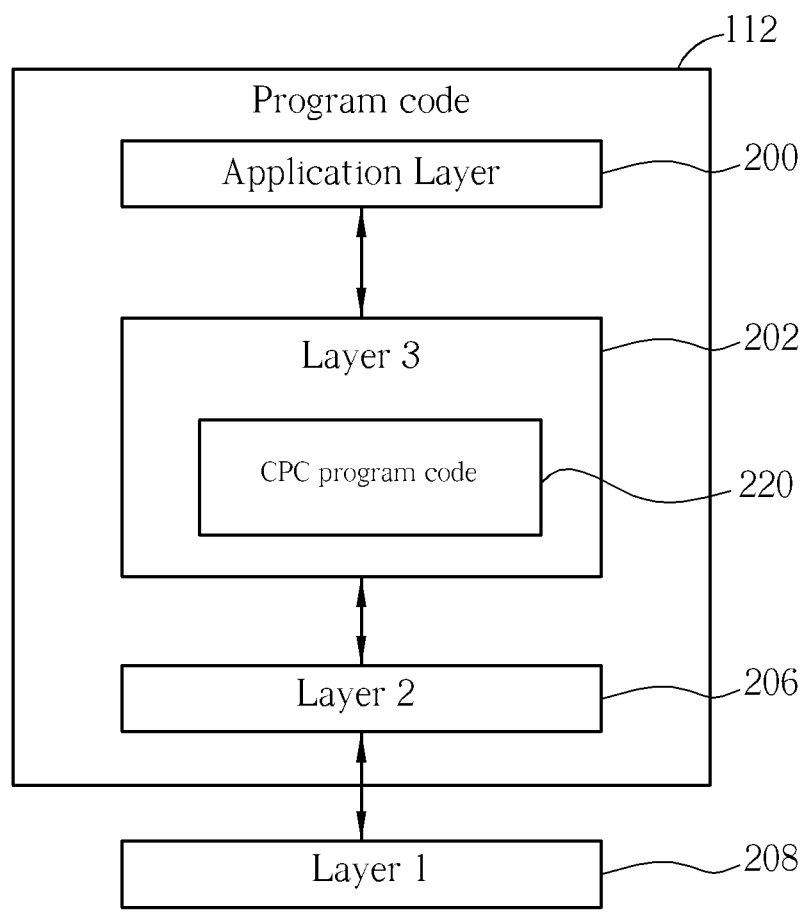
FIG. 2 is a diagram of the program code shown in FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 208. The Layer 3 202 is for performing radio resource control (RRC). The Layer 2 206 is for performing link control, and the Layer 1 208 is a physical layer.

Figure 3:
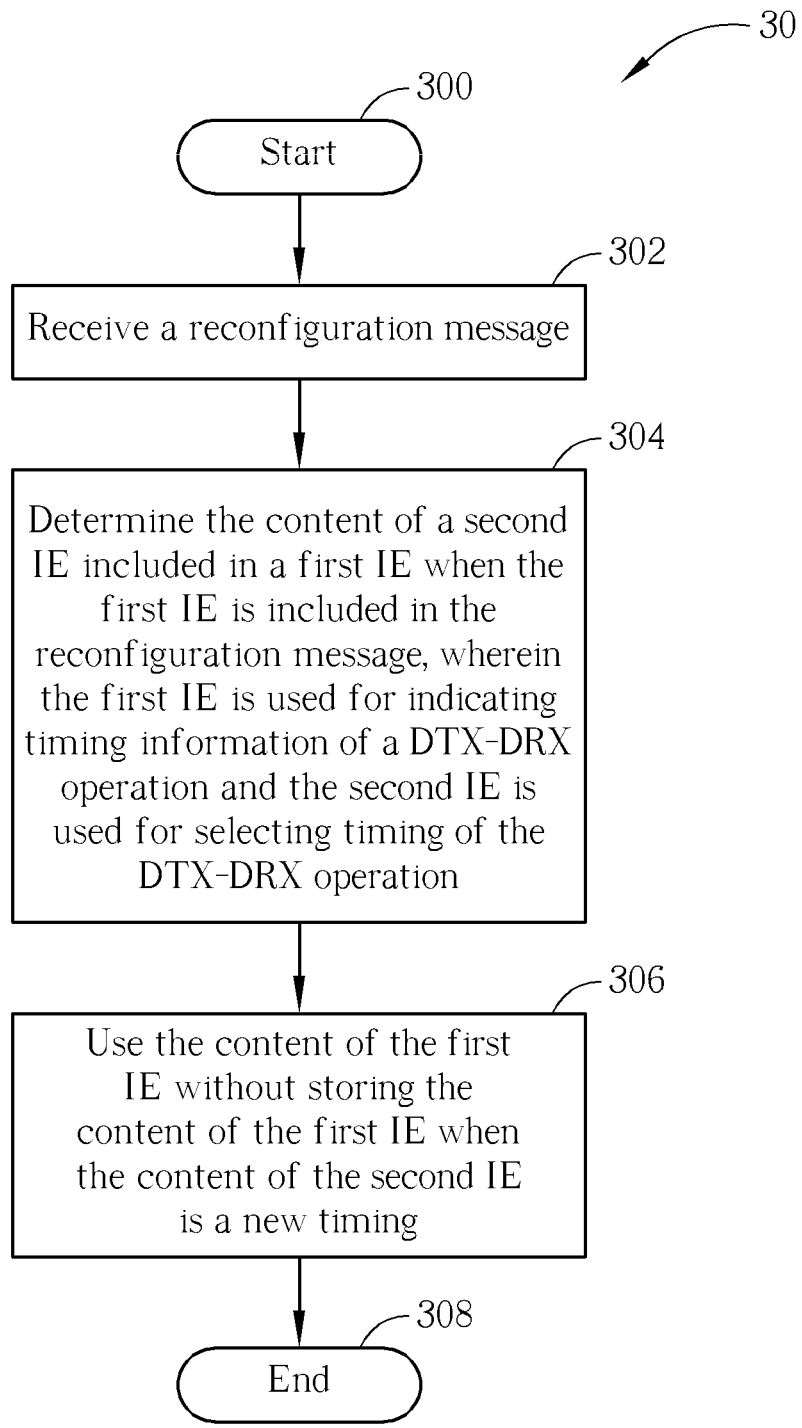
FIG. 3 to FIG. 5 are flowcharts of processes according to embodiments of the present invention.

According to the prior art, after a discontinuous transmission and discontinuous reception (DTX-DRX) operation is enabled, if the UE confirms that an information element (IE) "DTX-DRX timing information" is included in a received reconfiguration message and the content of an IE "CHOICE timing" included in the IE "DTX-DRX timing information" is "new timing", the UE does not only use the content of the IE "DTX-DRX timing information" but stores the content of the IE "DTX-DRX timing information" in a variable DTX_DRX_PARAMS. The embodiment of the present invention provides a CPC program code 220 for the program code 112 in the Layer 3 202, for using the IE "DTX-DRX timing information" without storing the IE "DTX-DRX timing information", so as to improve the DTX-DRX operation, and moreover, to improve efficiency of CPC. Please refer to FIG. 3, which is a flowchart of a process 30 according to an embodiment of the present invention. The process 30 is utilized for improving CPC for a UE in the wireless communications system 600, and can be compiled into the CPC program code 220. The process 30 includes the following steps:

Step 300: Start.

Step 302: Receive a reconfiguration message.

Step 304: Determine the content of a second IE included in a first IE when the first IE is included in the reconfiguration message, wherein the first IE is used for indicating timing information of a DTX-DRX operation and the second IE is used for selecting timing of the DTX-DRX operation.

Step 306: Use the content of the first IE without storing the content of the first IE when the content of the second IE is a new timing.

Step 308: End.

In the process 30, the first IE is the IE "DTX-DRX timing information", and the second IE is the IE "CHOICE timing". The content of the IE "CHOICE timing" comprises "new timing" or "continue". According to the process 30, when the UE receives the reconfiguration message and confirms that the IE "DTX-DRX timing information" is included in the reconfiguration message, the UE then determines the content of the IE "CHOICE timing" included in the IE "DTX-DRX timing information". When the content of the IE "CHOICE timing" is "new timing", the UE uses the content of the IE "DTX-DRX timing information" and does not store the content of the IE "DTX-DRX timing information". That is, the UE does not store the content of the IE "DTX-DRX timing information" in the variable DTX_DRX_PARAMS.

In the prior art, when the content of the IE "CHOICE timing" is "new timing", the UE shall store the content of the IE "DTX-DRX timing information" in the variable DTX_DRX_PARAMS when not using it. In comparison, the UE uses the content of the IE "DTX-DRX timing information" and does not store the content of the IE "DTX-DRX timing information" according to the process 30. Therefore, the unnecessary step of storing can be canceled for improving efficiency of CPC.

According to the prior art, after the DTX-DRX operation is enabled, the UE can stop the DTX-DRX operation only when any one of the following conditions is repealed:

1. the UE is in CELL_DCH state;
2. both variables HS_DSCH RECEPTION and E_DCH_TRANSMISSION are set to TRUE;
3. no DCH transport channel is configured;
4. a variable DTX_DRX_PARAMS is set; and
5. the UE received an IE "DTX-DRX timing information".

In the aspect of the UE, transmission efficiency will be reduced if the UE stops the DTX-DRX operation by repealing the condition 1, 2 or 3. On the other hand, after the DTX-DRX operation is enabled, it is impossible to stop the DTX-DRX operation by repealing the condition 4. Please note that the condition 5 means that the UE can start the DTX-DRX operation only when the IE "DTX-DRX timing information" is included in the received reconfiguration message. In other words, when the UE confirms that the IE "DTX-DRX timing information" is not included in the received reconfiguration message, the UE can stop the DTX-DRX operation.

Figure 4:
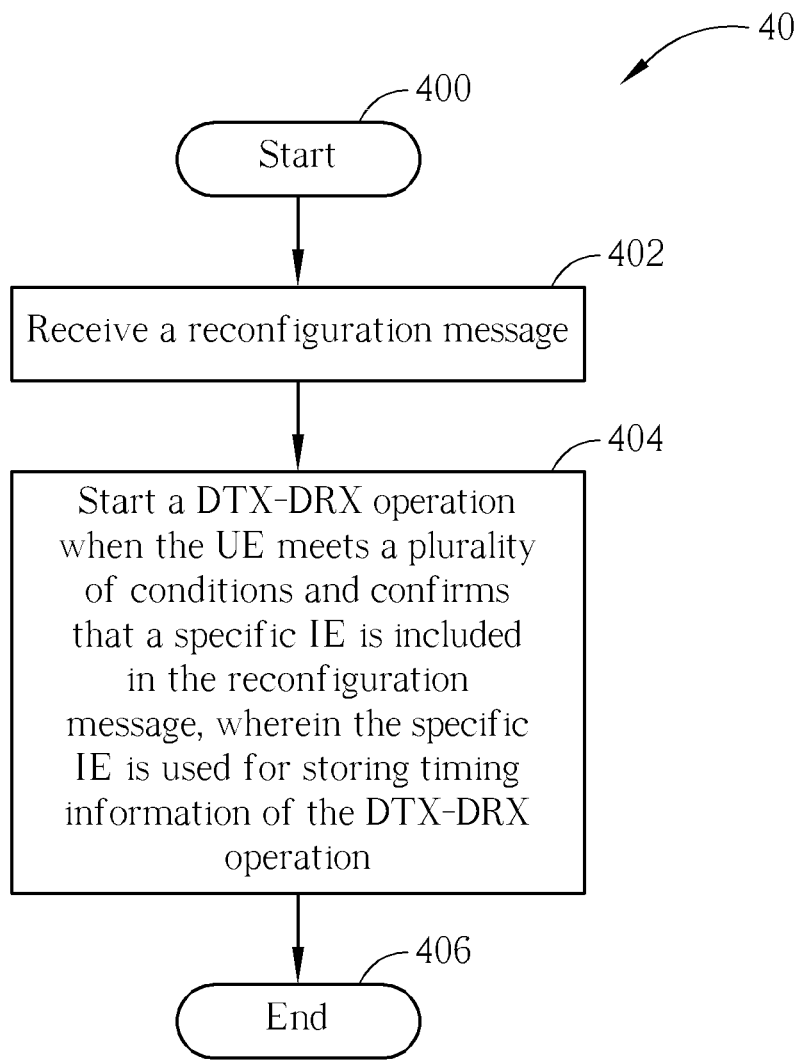

Please refer to FIG. 4, which is a flowchart of a process 40 according to an embodiment of the present invention. The process 40 is utilized for improving CPC for a UE in the wireless communications system 600, and can be compiled into the CPC program code 220. The process 40 includes the following steps:

Step 400: Start.

Step 402: Receive a reconfiguration message.

Step 404: Start a DTX-DRX operation when the UE meets a plurality of conditions and confirms that a specific IE is included in the reconfiguration message, wherein the specific IE is used for storing timing information of the DTX-DRX operation.

Step 406: End.

In the process 40, the plurality of conditions is the conditions 1-5 as above, and the specific IE is the IE "DTX-DRX timing information". According to the process 40, only when the UE meets the conditions 1-4 and the UE confirms that the IE "DTX-DRX timing information" is included in the reconfiguration message, does the UE set a variable DTX_DRX_STATUS to TRUE to start the DTX-DRX operation.

In other words, if the IE "DTX-DRX timing information" is not included in the received reconfiguration message, one of the conditions for starting the DTX-DRX operation is repealed so that the DTX-DRX operation should be stopped. For example, if the IE wants to stop the DTX-DRX operation after the DTX-DRX operation is enabled, the received reconfiguration message will not include the IE "DTX-DRX timing information", and therefore the UE can stop the DTX-DRX operation. In a word, the embodiment of the present invention changes the conditions for starting the DTX-DRX operation, so that the UE can stop the DTX-DRX operation easier instead of leaving CELL_DCH state or leaving the HSPA. Therefore, the embodiment of the present invention prevents transmission efficiency from being reduced.

Figure 5:
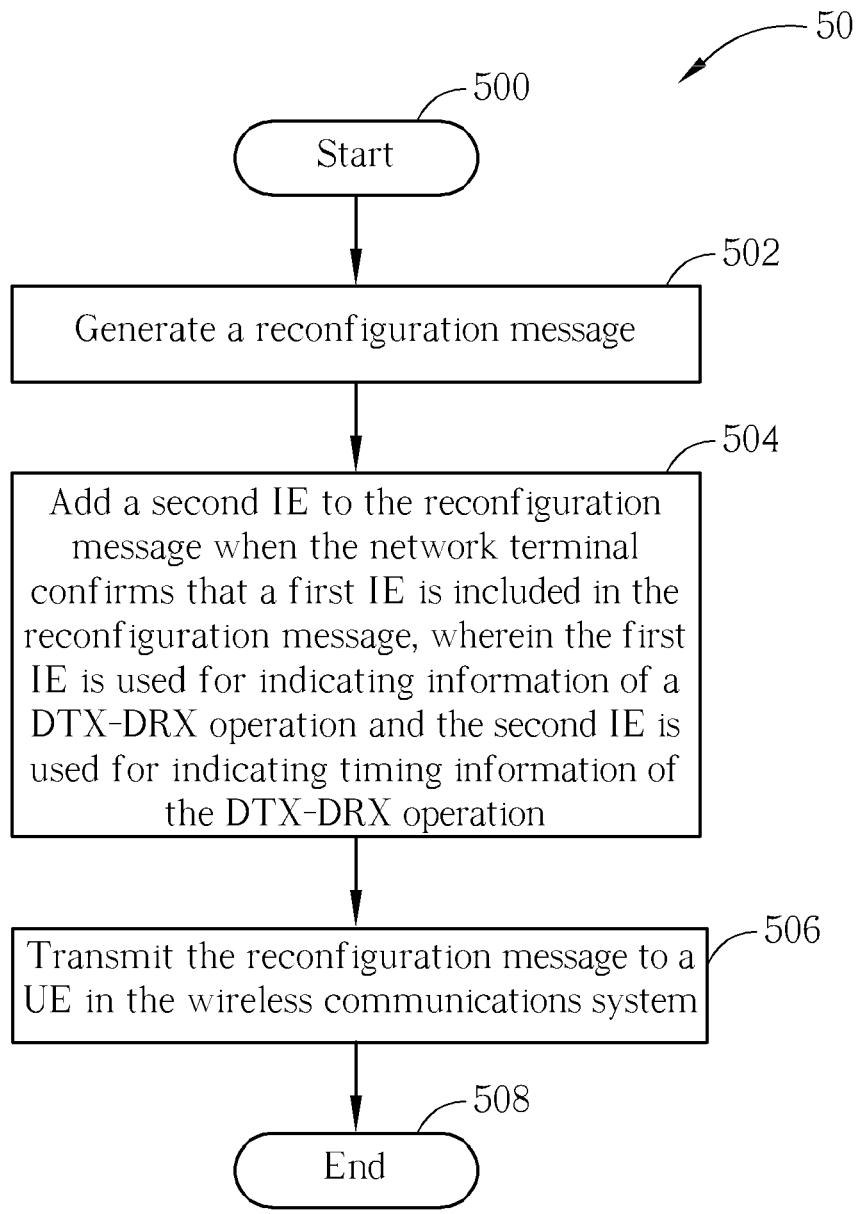

In addition, when an IE "DTX-DRX information" is included in the received reconfiguration message, the IE "DTX-DRX timing information" has to be included in the same message and the content of the IE "CHOICE timing" included in the IE "DTX-DRX timing information" should be "new timing", otherwise unknown behavior may occur. In this situation, the present invention provides a process 50 in a network terminal, for transmitting a correct reconfiguration message to the UE for avoiding unknown behavior. Please refer to FIG. 5, which is a flowchart of the process 50 according to an embodiment of the present invention. The process 50 is utilized for improving CPC for a network terminal in the wireless communications system 600, and can be compiled into the CPC program code 220. The process 50 includes the following steps:

Step 500: Start.

Step 502: Generate a reconfiguration message.

Step 504: Add a second IE to the reconfiguration message when the network terminal confirms that a first IE is included in the reconfiguration message, wherein the first IE is used for indicating information of a DTX-DRX operation and the second IE is used for indicating timing information of the DTX-DRX operation.

Step 506: Transmit the reconfiguration message to a UE in the wireless communications system.

Step 508: End.

In the process 50, the first IE is the IE "DTX-DRX information", and the second IE is the IE "DTX-DRX timing information". According the process 50, when the network terminal confirms that the IE "DTX-DRX information" is included in the reconfiguration message, the network terminal adds the IE "DTX-DRX timing information" to the reconfiguration message and then transmits the reconfiguration message to the UE. As a result, the reconfiguration message received by the UE will include the IE "DTX-DRX information" and the IE "DTX-DRX timing information", so that unknown behavior of the UE can be avoided.

Please note that when the IE "DTX-DRX information" and the IE "DTX-DRX timing information" are included in the same reconfiguration message, the content of the IE "CHOICE timing" should be "new timing". In addition, if the IE "DTX-DRX information" is not included but the IE "DTX-DRX timing information" is included in the reconfiguration message, the network terminal still transmits the reconfiguration message to the UE, so that the UE can keep using the DTX-DRX operation. Note that the content of the IE "DTX-DRX timing information" is "continue" in this situation. Compared with the prior art, the embodiment of the present invention avoids unknown behavior.

In conclusion, according to the embodiment of the present invention, the UE uses the content of the IE "DTX-DRX timing information" and does not store the content of the IE "DTX-DRX timing information", and therefore the unnecessary step of storing can be canceled for improving efficiency of CPC. Moreover, the embodiment of the present invention changes the conditions for starting the DTX-DRX operation, so that the UE can stop the DTX-DRX operation easier. Additionally, the embodiment of the present invention changes the content of reconfiguration message so that the IE "DTX-DRX timing information" and the IE "DTX-DRX timing information" are both included in the same reconfiguration message. Therefore, unknown behavior of the UE can be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of improving Continuous Packet Connectivity (CPC) for a user equipment, called UE hereafter, in a wireless communications system, the method comprising:
   receiving a reconfiguration message;
   determining the content of a second information element (IE) included in a first IE when the first IE is included in the reconfiguration message, wherein the first IE is used for indicating timing information of a discontinuous transmission and discontinuous reception (DTX-DRX) operation and the second IE is used for selecting a timing of the DTX-DRX operation; and
   using the content of the first IE without storing the content of the first IE when the second IF indicates a new timing.

2. The method of claim 1, wherein the new timing will be transmitted to the UE when a network terminal in the wireless communications system wants to reconfigure the timing of the DTX-DRX operation.

3. The method of claim 1, wherein the first IF is a DTX-DRX timing information IE.

4. The method of claim 1, wherein the second IE is a choice timing IE and the content of the choice timing IE comprises "new timing" or "continue".

5. The method of claim 1, wherein the content of the first IE is not stored in a DTX-DRX operation parameter variable that is used for storing associated parameters of the DTX-DRX operation.

6. A communications device used in a wireless communications system for improving Continuous Packet Connectivity (CPC), the communications device comprising:
   a control circuit for realizing functions of the communications device;
   a central processing unit installed in the control circuit for executing a program code to operate the control circuit; and a memory coupled to the central processing unit for storing the program code;
   wherein the program code comprises:
      receiving a reconfiguration message;
      determining the content of a second information element (IE) included in a first IE when the first IE is included in the reconfiguration message, wherein the first IE is used for indicating timing information of a discontinuous transmission and discontinuous reception (DTX-DRX) operation and the second IE is used for selecting a timing of the DTX-DRX operation; and
      using the content of the first IE without storing the content of the first IE when the second IE indicates a new timing.

7. The communications device of claim 6, wherein the new timing will be transmitted to the communications device when a network terminal in the wireless communications system wants to reconfigure the timing of the DTX-DRX operation.

8. The communications device of claim 6, wherein the first IE is a DTX-DRX timing information IE.

9. The communications device of claim 6, wherein the second IE is a choice timing IE and the content of the choice timing IE comprises "new timing" or "continue".

10. The communications device of claim 6, wherein the content of the first IE is not stored in a DTX-DRX operation parameter variable that is used for storing associated parameters of the DTX-DRX operation.

11. A method of improving Continuous Packet Connectivity (CPC) for a network terminal in a wireless communications system, the method comprising:

generating a reconfiguration message;

adding a second information element (IE) to the reconfiguration message when the network terminal confirms that a first IE is included in the reconfiguration message, wherein the first IE is used for indicating information of a discontinuous transmission and discontinuous reception (DTX-DRX) operation and the second IE is used for indicating timing information of the DTX-DRX operation;

transmitting the reconfiguration message to a user equipment in the wireless communications system; and stopping the DTX-DRX operation when the second IE is not included in the reconfiguration message.

12. The method of claim 11, wherein the first IE is a DTX-DRX information IE.

13. The method of claim 11, wherein the second IE is a DTX-DRX timing information IE.

14. The method of claim 11, wherein the content of the second IE is a new timing.

15. The method of claim 11 further comprising: transmitting the reconfiguration message to the user equipment when the network terminal confirms that the first IE is not included but the second IE is included in the reconfiguration message.

16. A communications device used in a wireless communications system for improving Continuous Packet Connectivity (CPC), the communications device comprising:

a control circuit for realizing functions of the communications device;

a central processing unit installed in the control circuit for executing a program code to operate the control circuit; and a memory coupled to the central processing unit for storing the program code;

wherein the program code comprises: generating a reconfiguration message;

adding a second information element (IE) to the reconfiguration message when the communications device confirms that a first IE is included in the reconfiguration message, wherein the first IE is used for indicating information of a discontinuous transmission and discontinuous reception (DTX-DRX) operation and the second IE is used for indicating timing information of the DTX-DRX operation;

transmitting the reconfiguration message to a user equipment in the wireless communications system; and stopping the DTX-DRX operation when the second IE is not included in the reconfiguration message.

17. The communications device of claim 16, wherein the first IE is a DTX-DRX information IE.

18. The communications device of claim 16, wherein the second IE is a DTX-DRX timing information IE.

19. The communications device of claim 16, wherein the content of the second IE is a new timing.

20. The communications device of claim 16, wherein the program code further comprises: transmitting the reconfiguration message to the user equipment when the communications device confirms that the first IE is not included but the second IE is included in the reconfiguration message.

* * * * *